Dec. 19, 1961   W. P. ANDERSON ET AL   3,013,790
PRESSURE REGULATING VALVE ADJUSTMENT MECHANISM
Filed Aug. 10, 1960
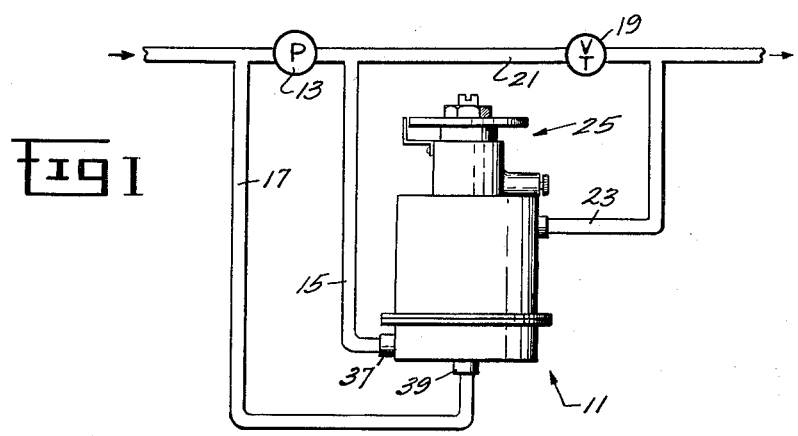
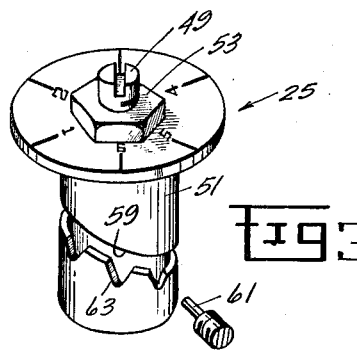
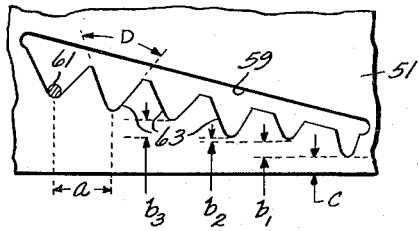
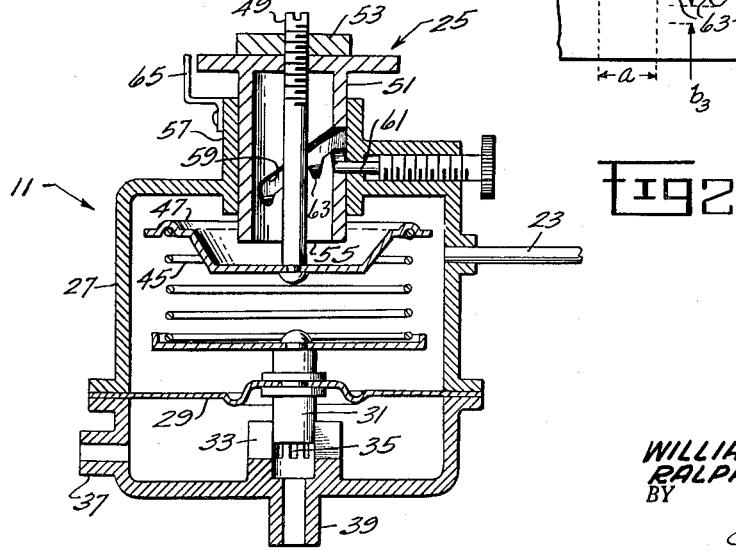
INVENTORS.
WILLIAM P. ANDERSON
RALPH E. PENFIELD
BY
Carl Baker
ATTORNEY- United States Patent Office 3,013,790
Patented Dec. 19, 1961

3,013,790
PRESSURE REGULATING VALVE
ADJUSTMENT MECHANISM
William Paul Anderson, Wenham, and Ralph Eldren Penfield, Saugus, Mass., assignors to General Electric Company, a corporation of New York
Filed Aug. 10, 1960, Ser. No. 48,761
3 Claims. (Cl. 267—1)

This invention relates generally to adjustment mechanism for pressure regulating valves and like devices, and more particularly relates to such valves incorporating loading spring means and means for varying, in discrete steps, the spring loading force as necessary to effect desired adjustment of the valve operating pressure setting.

Automatic control valves for fluid pressure regulation commonly include movable wall means such as a piston or diaphragm subjected on one side to the pressure to be regulated, with the movable wall means being coupled to actuate a valve element which may be of either throttling or bypass flow type and operative to so regulate fluid flow as to maintain the desired pressure level. Normally the movable wall means is force loaded in one direction by the applied fluid pressure and in the other direction by a loading spring assisted by a reference pressure applied to the reverse side of the movable wall means. It is common in pressure regulating valves of this type to provide means for adjusting the loading spring so as to vary its loading force on the movable wall means and thus vary the pressure level at which the valve controls.

Such adjustment of the pressure regulating valve setting may be desired for many different reasons depending on the requirements of the particular application in which the valve is to be employed. For example, in turbojet engine fuel control systems pressure regulating valves of this type frequently are used to hold constant pressure drop across a main fuel metering or throttling valve, to thus assure that fuel flow through the main metering valve will be accurately proportioned to its open area. Because it often is desired to utilize interchangeably several different types and grades of fuels, which may have substantially different specific weights and heat content, it becomes necessary in such cases to provide compensation for these fuel differences in order to enable the main metering valve to regulate fuel flow with desired accuracy. Such compensation usually is accomplished by adjustment of the valve loading spring to control the operating point of the valve in the manner just explained, to vary the pressure drop which it holds across the main metering valve.

The present invention is directed to valve constructions of the general type just described and has as its principal objective the provision of new and improved mechanism for effecting adjustment of the valve loading spring to control the operating point of the valve. Another object of the invention is the provision of loading spring adjustment mechanism wherein the force and travel required for movement of the adjustment mechanism between settings is uniform even though the resultant change in spring loading force is or many be nonuniform. It is also an object of the invention to provide loading spring adjustment mechanism characterized by simplicity of construction and economy of fabrication, yet affording convenience of operation and good precision of adjustment.

In carrying out the invention in one presently preferred embodiment, there is provided a pressure regulating valve of the type including a flow control element positioned by a flexible diaphragm or like wall means movable within the valve housing in response to unbalance between applied forces one of which is fluid pressure derived and one generated by a loading spring acting against the wall means in opposition to the fluid pressure derived force. In accordance with the invention, the force loading of this spring may be varied to control the valve operating point by adjustment mechanism comprising a detent element mounted in the housing for free movement along two different paths of motion one of which is substantially parallel to the line of action of the loading spring, with the spring and detent element being coupled together so that movement of the latter along its one path of motion causes variation of the spring loading force on the movable wall means. The detent element has formed therein a slot disposed with its long dimension along the other of the two paths of motion of the detent element, and with a plurality of notches each opening into the slot and extending in a direction substantially parallel to the line of action of the loading spring. A pin element carried by the housing projects into and seats in one of the notches selected by movement of the detent element, to thus determine the loading force which the spring exerts against the movable wall means and to set the operating point of the valve accordingly. With this arrangement it is the depth of the notches rather than the spacing therebetween which determines the valve operating point; it therefore is possible to obtain nonuniform variations of valve operating point even with uniform spacing between notches, and by properly sloping the notch walls it also is possible to assure uniformity of the force required to effect movement of the detent element between settings.

The invention will itself be further understood and its various objects, features and advantages more fully appreciated by reference to the appended claims and the following detailed description when read in conjunction with the accompanying drawings, wherein:

FIGURE 1 is a schematic diagram of a pressure fluid supply and regulating system incorporating a pressure regulating valve in accordance with the invention;

FIGURE 2 is a part sectional view of the pressure regulating valve of FIGURE 1;

FIGURE 3 is a detail view of the detent element in the valve assembly of FIGURE 2; and FIGURE 4 is a development of a peripheral surface portion of the detent element of FIGURE 3.

With continued reference to the drawings, wherein like reference numerals have been used throughout to designate like elements, FIGURE 1 illustrates the invention as embodied in a pressure regulator of bypass flow type. It is to be understood, however, that the invention also is applicable to pressure regulators of throttling type as well as to like devices which incorporate a loading spring requiring convenient yet precise adjustment of the spring loading force.

The pressure regulating valve designed generally by reference numeral 11 in FIGURE 1 is shown connected to bypass a varying portion of the discharge flow of a pump 13 back to the pump inlet, with the bypass flow being ducted through a conduit 15 to the pressure regulating valve 11 and from there through a conduit 17 back to the inlet line to pump 13. As will be explained, the operation of valve 11 is responsive to the differential between the fluid pressures upstream and downstream of a metering valve 19 which is interposed in the pump discharge line 21, with these pressures being communicated to the pressure regulating valve 11 through conduits 15 and 23, respectively. The regulating valve 11 responds to these pressures on either side of metering valve 19 to hold their difference constant, to thus assure that the rate of fluid flow through the metering valve is accurately proportioned to its open area irrespective of fluctuations in pump supply pressure or in the pressure level downstream of the metering valve. The pressure drop held by the regulating valve is determined by the setting of valve adjustment mechanism which is indicated generally at 25 and described in detail hereinafter.

With reference now to FIGURE 2, the pressure regulating valve assembly is here shown in part section. This assembly comprises a housing 27 defining a closed chamber the interior of which is compartmented by movable wall means 29 shown in the form of a flexible diaphragm mounted peripherally to housing 27 for flexing movement responsive to fluid pressure differences across the diaphragm. A flow control element shown in the form of a valve plunger 31 is fixed to diaphragm 29 at its center for movement therewith, and is slidable within a seat element 33 slotted as at 35 to constitute a bypass valve orifice of open area dependent on the longitudinal position of plunger 31. The valve assembly thus constituted meters bypass fuel flow through an inlet fitting 37 to which is connected to conduit 15 downstream of pump 13 (FIGURE 1), to an outlet fitting 39 which connects to the inlet of pump 13 through conduit 17 in FIGURE 1.

Since the pressure in conduit 15 is the pressure upstream of metering valve 19 the diaphragm 29 is subjected on its lower side to this upstream pressure, and since the pressure in conduit 23 is that downstream of the metering valve this downstream pressure acts on the upper side of diaphragm 29. The movement of diaphragm 29 is responsive to the difference of these two pressures and thus to the pressure drop across the metering valve, and it controls the bypass valve 35 so as to hold this throttle valve pressure drop constant at desired value.

The pressure drop so held is dependent upon the spring force with which the diaphragm 29 is loaded by spring 45, since this spring force adds to the force generated by the fluid pressure acting on the upper side of diaphragm 29 and the resultant must balance against the force generated by the higher fluid pressure acting on the lower side of the diaphragm. In operation, if the pressure drop across throttle valve 19 rises above the control value this condition will be manifested as an increase in the pressure difference across diaphragm 29, and this will cause the diaphragm to move upwardly against the force of spring 45 to open the valve 35 sufficiently to bypass enough additional fluid to bring the pressure drop across throttle valve 19 back down to the desired value.

The loading spring adjustment mechanism designated generally by reference numeral 25 comprises a spring retainer element 47 against which is seated the end of the loading spring remote from diaphragm 29. Retainer element 47 is fixed to the inner end of a stud 49 the outer end of which is fixedly supported in a detent element 51 by threaded interconnection therewith, a locknut 53 being provided to interlock the stud and detent element in assembled relation as shown.

The detent element 51 preferably is of hollow cylindrical form as illustrated, and is slidably received in an axially elongated tubular guide element 57 shown integral with the regulator housing 27, the arrangement being such that movement of the detent element inwardly and outwardly with respect to housing 27 is effective to vary the force with which spring 45 loads diaphragm 29. Detent element 51 is also free for rotary movement in the guide element 57, with movement in both the rotary and translatory modes being controlled by co-acting pin and slot means associated with the detent element and housing, respectively.

Thus, the detent element 51 has formed therein a circumferentially disposed inclined slot 59 the lower surface of which is notched, as best shown in FIGURES 3 and 4, to engage the inner end of a locking pin 61 which projects through the housing 27 and guide element 57 adjacent the slot 59. This locking pin 61 preferably is threadedly secured in the housing so as to permit retraction of the pin thereby enabling removal of the detent element 51. The slot 59 is provided with a number of notches 63 in its lower surface with each notch constituting one setting of the regulator.

To adjust the regulator from one setting to another, the operator may depress the detent element 51 inwardly until the locking pin 61 clears the walls of the notch 63 in which it was engaged; the detent element then is rotated to align the locking pin 61 with another notch 63, with such alignment being indicated to the operator as by a pointer 65 affixed to housing 27 adjacent appropriately disposed index lines inscribed on the detent element 51 (FIGURE 3); then after reaching the desired new setting the detent element is released allowing it to move outwardly to bring the locking pin 61 into locking engagement with the aligned one of the notches 63. It will be noted that this outward movement of the detent element and the necessary bias force required to effect interlocking of the pin and notch is provided by the main loading spring 45; no additional spring is needed for this detent mechanism.

Alternatively, the regulator may be adjusted from one setting to another simply by rotating the detent element 51, with the camming action occurring between locking pin 61 and the sloping side walls of the notch 63 in which it is engaged being relied upon to depress the detent element inwardly to thus enable the pin 61 to ride over the wall of that notch and drop into the next adjacent one. By sloping the side walls of notches 63 in the particular manner specified hereinafter, the turning force required to rotate the detent element 51 between settings may be made uniform despite the non-uniformity of applied spring force, thus facilitating adjustment.

In accordance with the invention, any desired relationship may be obtained between the angular spacing of the notches 63 and the fluid pressure setting corresponding to each index point, simply by making the notches 63 of proper depth. Since the spring loading force is dependent only upon the depth of the notches 63 and is unaffected by the angular spacing of the notches about the circumference of detent element 51, it becomes readily possible to space the notches uniformly and at the same time to have nonuniform variation of the pressure values held by the regulator at successive rotational settings thereof.

FIGURE 4, for example, illustrates a representative arrangement wherein the angular spacing "$a$" between notches 63 is uniform from notch to notch and the necessary rotational movement of the detent element between settings is likewise uniform, but the changes in regulated pressure level which result from adjustment of the regulator from setting to setting are nonuniform by reason of the variation in size of the increments "$b_1$"–"$b_3$" through which the spring is reset in progressing from notch to notch leftwardly in FIGURE 4. In each case, it is the distance "$c$" from the bottom of the notch 63 to a reference line such as the inner end of the detent element 51 which is controlling, since the variation in this distance provides the effective change in spring setting.

It will be noted that as the detent element 51 is adjusted to shift the element inwardly of the housing to increase the compression of spring 45, the spring force tending to load the locking pin 61 into the base of whichever one of the notches 63 it then is engaged in will increase correspondingly. In order to assure that the force necessary to be applied to the detent element 51 to rotate it remains substantially constant notwithstanding this change in effective spring load on the locking pin, the side walls of the notches 63 preferably are sloped outwardly at an angle "$D$" which is proportioned to the distance "$c$" between the base of the notch 63 and a reference line which in FIGURE 4 is shown as the inner edge of the detent element 51. By thus varying the slope of the sides of notches 63, the torque necessary to turn the detent element 51 between rotational settings may be made uniform despite the nonuniformity of applied spring force, thus facilitating adjustment by the operator.

As previously mentioned, the detent element 51 is threadedly interconnected with the stud 49 to which spring retainer member 47 is affixed. The threaded interconnection between these elements provides a "fine" adjustment particularly useful in calibrating the regulator as at initial assembly. Once properly set, this adjustment normally is locked as by the locknut 53, and operational adjustments then are effected by rotation of the detent element as just explained.

While one preferred embodiment of the invention has been described and illustrated by way of example in the foregoing, many modifications will occur to those skilled in the art and it therefore should be understood that the appended claims are intended to cover all such modifications as fall within the true spirit and scope of the invention.

What is claimed as new and desired to be secured by Letters Patent of the United States is:

1. Spring adjustment means for a fluid pressure regulator including a flow control element positioned by movable wall means comprising, a housing, a loading spring within said housing, adjustment mechanism for varying the force load applied by said spring comprising a detent element, a guide element in said housing mounting said detent element for translatory movement along a line substantially parallel to the line of action of said spring and for rotation about an axis substantially parallel to said line of action, means coupling said spring to said detent element whereby translatory movement thereof may cause variation of the loading force of said spring, one of said detent and guide elements having formed therein a circumferentially disposed slot and a plurality of notches each opening into said slot and extending in the direction of the spring line of action, and a pin element mounted in the other of said detent and guide elements and projecting into and seating in any selected one of said notches to determine the loading force which said spring exerts, said notches being uniformly spaced about said one element and of depth such that their bottoms are nonuniformly spaced along the line of action of said spring so as to effect nonuniform changes in spring loading on movement from notch to notch.

2. Spring adjustment means for a fluid pressure regulator including a flow control element positioned by movable wall means comprising, a housing, a loading spring within said housing, adjustment mechanism for varying the force load applied by said spring comprising a detent element, a guide element in said housing mounting said detent element for translatory movement along a line substantially parallel to the line of action of said spring and for rotation about an axis substantially parallel to said line of action, means coupling said spring to said detent element whereby translatory movement thereof may cause variation of the loading force of said spring, one of said detent and guide elements having formed therein a circumferentially disposed slot and a plurality of notches each opening into said slot and extending in the direction of the spring line of action, and a pin element mounted in the other of said detent and guide elements and projecting into and seating in any selected one of said notches to determine the loading force which said spring exerts, each of said notches having its side walls sloped outwardly from the bottom of the notch at an angle proportioned to the spacing between the notch bottom and a reference line normal to said spring line of action.

3. Adjustment mechanism as defined in claim 2 wherein said notches are uniformly spaced about said one element and are of depth such that their bottoms are non-uniformly spaced along the line of action of said spring so as to effect non-uniform changes in spring loading on movement from notch to notch.

References Cited in the file of this patent

UNITED STATES PATENTS

| | | |
|---|---|---|
| 1,804,751 | Doble | May 12, 1931 |
| 2,891,784 | Taylor | June 23, 1959 |
| 2,917,067 | Pearl | Dec. 15, 1959 |

FOREIGN PATENTS

| | | |
|---|---|---|
| 911,567 | Germany | May 17, 1954 |